United States Patent [19]

Geiger

[11] Patent Number: 4,896,082
[45] Date of Patent: Jan. 23, 1990

[54] RASTER DISTORTION CORRECTION CIRCUIT

[75] Inventor: Erich Geiger, Unterkirnach, Fed. Rep. of Germany

[73] Assignee: Deutsche Thomson-Brandt GmbH, Villingen-Schwenningen, Fed. Rep. of Germany

[21] Appl. No.: 362,542

[22] Filed: Jun. 7, 1989

Related U.S. Application Data

[63] Continuation of PCT EP88/00872 filed Sep. 28, 1988.

[51] Int. Cl.⁴ .................. H01J 29/70; H01J 29/76
[52] U.S. Cl. .................................. 315/368; 358/67; 358/69; 315/10
[58] Field of Search .............. 315/368, 370, 371, 10; 358/67, 68, 69

[56] References Cited

U.S. PATENT DOCUMENTS

| 4,159,484 | 6/1979 | Strathman | 358/67 |
| 4,352,047 | 9/1982 | Imayasu et al. | |
| 4,369,396 | 6/1983 | Judd | 358/68 |
| 4,593,308 | 6/1986 | Kemplin | 315/368 |

OTHER PUBLICATIONS

Japanese Pat. Appl. No. SHO 61-136381-Eicho Shima, "Screen Distortion Correcting Device".

German Pat. Appl. No. DE-3136029A1-Nersthemimer et al., "Circuit Configuration for Reproducing A Television Picture With Lines Alternatingly In the Opposite Direction".

Japanese Patent Appl. No. 62-122463-T. Matyumoto, "Cathode Ray Tube".

U.K. Pat. Appl. No. GB2102258A-D. Denham, "Closed-Loop Correction System For CRT-type Display".

Primary Examiner—Theodore M. Blum
Attorney, Agent, or Firm—Joseph S. Tripoli; Joseph J. Laks; Sammy S. Henig

[57] ABSTRACT

In a circuit arrangement for correcting a raster distortion in a cathode ray tube, at least one vertical perforated, index strip of a sensor is arranged at a corresponding margin of a picture producing screen of the cathode ray tube. An index signal that is indicative when the electron beam passes the index strip is generated. The index signal is coupled through an enclosure of the cathode ray tube in a nonconductive manner to a second electrode that is located outside the enclosure. A comparator circuit is used for comparing the index signal with a line deflection representative signal to generate a control signal that corrects the raster distortion.

14 Claims, 2 Drawing Sheets

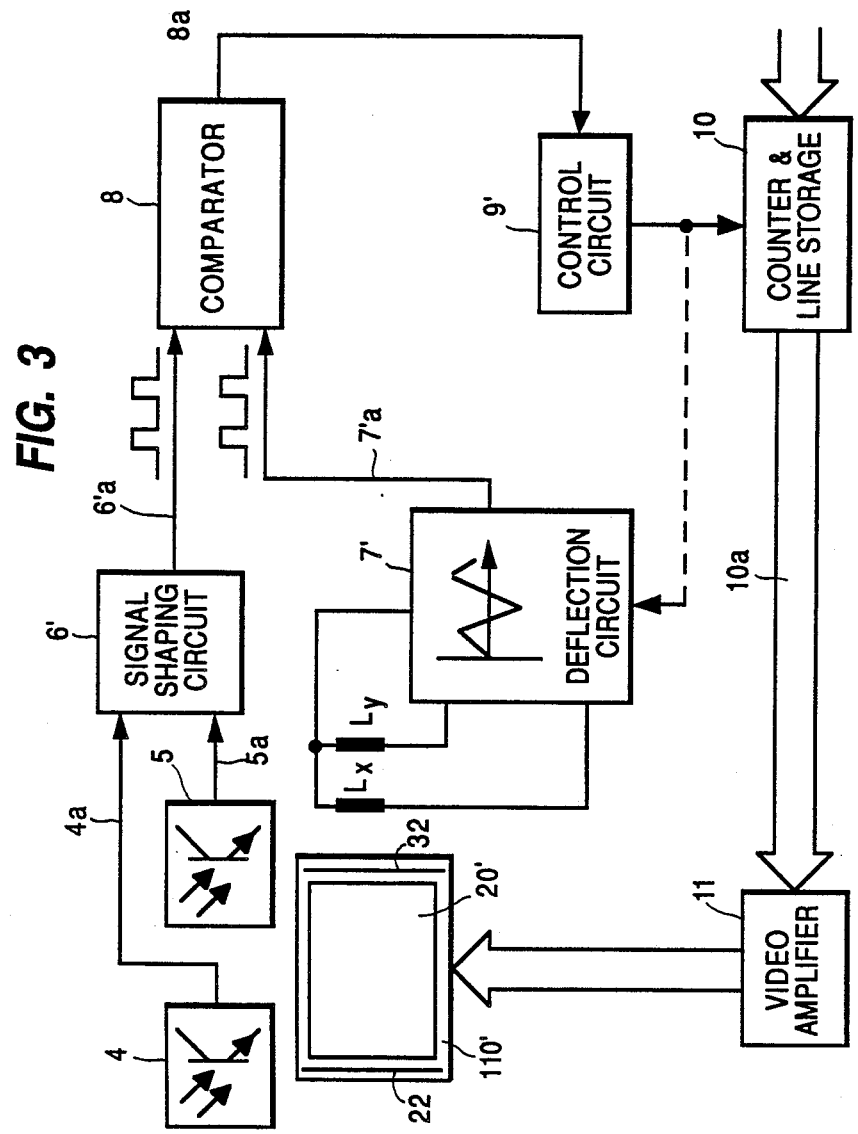

RASTER DISTORTION CORRECTION CIRCUIT

This is a continuation of PCT EP 88/00872 filed Sept. 28, 1988, designating the United States and claiming priority from a German Patent Application filed Sept. 30, 1987, Ser. No. P 37 33 007.

The invention relates to a circuit arrangement for correcting a raster distortion in the picture reproduction of a cathode ray tube (CRT) such as, for example, linearity errors.

Linearity errors in the picture reproduction of a CRT might show as, for example, convergence errors, pincushion distortions or line displacements. Line displacements are manifested by misalignment of displaced picture elements (pixels) in the vertical direction. Such misalignment is caused by variations, from one horizontal line to the next one, of the starting points at the left side of the CRT screen where horizontal scanning of corresponding scanning lines begin.

German patent no. DE-OS 31 36 029 describes a circuit arrangement which identifies the present position of the dot formed on the CRT screen by the electron beam striking the CRT screen. In such arrangement, an index CRT is used in which additional stripes, are inserted between the vertical color stripes of the CRT screen. The additional stripes are used for evaluating the position of the dot on the CRT screen that is formed by the corresponding electron beam and for controlling accordingly a storage device. The storage device is controlled in such a way that linearity faults may be eliminated in the picture information of the dots that are produced by the corresponding electron beams.

In accordance with a feature of the invention, an index device that is arranged inside a glass envelope or enclosure of the CRT is arranged outside the area of a picture producing luminous coat of the CRT that forms the CRT screen. Because the index device is placed separately from and outside of the area the luminous coat, the screen area available for picture reproduction is, advantageously, not reduced. Also, such index device, advantageously, does not disturb the picture reproduction.

The index device may be formed by an electrode that is disposed inside the CRT enclosure. A second electrode may be disposed outside the CRT enclosure. An index signal that is developed at the first electrode is coupled to the second electrode in, for example, a capacitive manner.

In a first circuit, embodying an aspect of the invention, the first electrode is arranged in the path of the electron beam. The first electrode may be suitably perforated to permit the passage of the electron beam therethrough on its way to the luminous coat of the CRT. At the margin or outside the normal projection area of the electron beam, the first electrode need not be perforated. When the electron beam strikes the first electrode, a charge is built-up in the first electrode. The charge is capacitively coupled through the CRT enclosure, that is formed by a dielectric material such as glass, to the second electrode. The first electrode that is arranged inside the enclosure of the CRT may be coupled to the shadow mask of the CRT through a bleeder resistor.

The index signal that is indicative where and when the electron beam strikes the CRT screen may be tapped or sensed at the second electrode that is located outside the enclosure of the CRT. As a result of the capacitive coupling between the first and second electrodes, lead-through connection, or conductive signal path through the glass body of the enclosure of the CRT, advantageously, need not be used.

The index device may be constructed using light emitting or luminance strips. Manufacturing of the index device strips and manufacturing of the picture producing luminous coat of the CRT may be done together. By manufacturing them together, a better controlled geometrical relationship or alignment between the index device strips and the picture producing luminous coat of the CRT is obtained.

The positioning of the index device strip coincides with maximum nonlinearity distortion, usually occurring at the picture contours. This facilitates signal processing of the index signal. Moreover, the area of the picture producing luminous coat of the CRT is not diminished or interrupted by the index device strips. Therefore, advantageously, the picture production capabilities of the CRT screen is not impaired.

In an arrangement embodying an aspect of the invention, a symmetrical line deflection, such as a sinusoidal horizontal line deflection or a symmetrical sawtooth horizontal line deflection, is utilized. A video signal that contains the picture information is applied to the guns of the CRT through a storage device. Picture element signals or pixel signals may be read out of the storage device and applied to the guns of the CRT both during the forward and backward scanning of the electron beam. A comparator circuit is used for comparing the index signal with a line deflection representative signal. A control circuit responsive to the comparator output signal regulates the displacement of the picture element or pixel signals of successively written video lines in the storage device so as to correct for the raster distortion.

The electron beam is sensed by means of the index strips at the picture contours to produce the index signal. The index signal is compared with the line deflection representative signal. If no distortion occurs, the index signal and line deflection representative signal occur, for example, simultaneously. On the other hand, if a distortion occurs, a time difference will occur between such signals. This results in a control signal that is generated by the comparator having a magnitude that varies in accordance with the time difference between the signals.

An undesirable increase, for example, in the magnitude of deflection of the electron beam in a given horizontal line, if not corrected, disadvantageously, would cause a visible distortion. The feedback control signal thus produced in the comparator circuit is used for carrying out the necessary raster distortion correction. Such raster distortion correction might be carried out by regulating the deflection current. Alternatively, such raster distortion correction may be effectuated by selectively advancing or retarding the timings of corresponding pixel signals contained in the picture content carrying video signal. Such pixel signals are coupled to the corresponding guns of the CRT. If, for example, the striking dot formed by the electron beam is positioned too far to the right of the screen at a given instant, the picture content carrying video signal of the next horizontal line will be suitably applied earlier to the gun. In this way, alignment of corresponding picture portions or pixels in the vertical direction is achieved.

Advancing or retarding the timing of the pixel signals is implemented by storing the picture content carrying video signal in a line storage device which contains the information of, for example, one horizontal scanning line. A location or address counter of such line storage produces a value that increases and decreases in accordance with the index signal. In the read out operation of the storage locations of the following horizontal video line, the undesirable line displacement of the electron beam is compensated.

In accordance with an aspect of the invention, a cathode ray tube for displaying an image includes an evacuated enclosure containing an electron beam gun and a perforated, first electrode disposed inside the enclosure. The first electrode is responsive to the electron beam for generating a first index signal that varies when the electron beam passes through the perforations in the first electrode such that the index signal is indicative of a position of the electron beam. A second electrode is disposed outside the enclosure and capacitively coupled through the enclosure to the first electrode for developing in the second electrode a second index signal that varies in accordance with the first index signal and that is indicative of the position of the electron beam.

FIG. 3 illustrates a block diagram of a circuit for the correction of horizontal displacement of horizontal lines.

Figure 1:
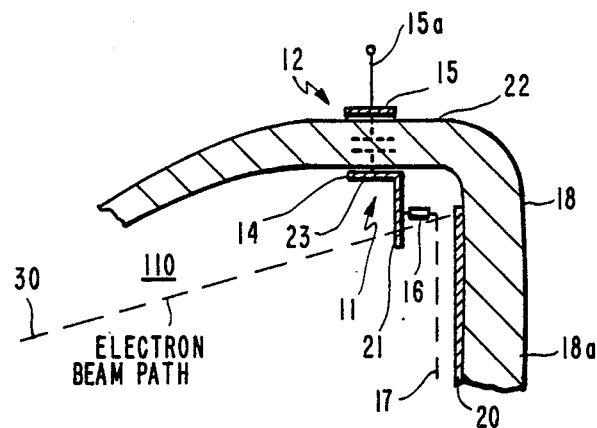
FIG. 1 illustrates a longitudinal section through a portion of a cathode ray tube, embodying an aspect of the invention, that includes an index device formed by electrodes.

In FIG. 1, a longitudinal section of a portion of a CRT 110 is depicted. A picture producing luminance coat 20 is disposed on the inside of a front panel 18a of a glass envelope or enclosure 18 of CRT 110. A shadow mask 17 is arranged behind coat 20. Electrodes 14 having, each, an L-shaped cross section, as shown in FIG. 1, are arranged behind shadow mask 17. A leg 21 of a given electrode is disposed in a plane that is, for example, in parallel with luminous coat 20 inside enclosure 18. Leg 21 extends into a projection area of an electron beam 30 of CRT 110. A leg 23 of electrode 14 is also disposed inside enclosure 18 in parallel with and adjacent to an outer surface 22 of enclosure 18 of CRT 110. Electrodes 15 are arranged, each, on the outer surface 22 of CRT 110. Each of electrodes 15 is arranged opposite the corresponding one of electrodes 14. A given electrode 15 of the pair of electrodes 14 and 15 is capacitively coupled through a dielectric material that forms enclosure 18 to the corresponding electrode 14 of the pair. Each of electrodes 14 is conductively coupled to shadow mask 17 through a bleeder resistor 16.

Several pairs of electrodes 14 and 15 may be disposed in the path of electron beam 30 at different locations around the circumference of coat 20. For example, it may be advantageous to provide corresponding pairs of electrodes 14 and 15 in the top and bottom margins, in an intermediate point in the left and right side margin and, if necessary, in an intermediate point in the side margins of luminous coat 20.

As electron beam 30 strikes a given one of electrodes 14, a charge is generated in such electrode 14. The charge in electrode 14 is discharged through bleeder resistor 16 after electron beam 30 is deflected away from electrode 14.

The charge is capacitively coupled through the glass of enclosure 18 to the corresponding electrode 15 of the pair of electrodes 14 and 15 and an index signal 15a is tapped or sensed at electrode 15. Because the pair of electrodes 14 and 15 are capacitively coupled, advantageously, there is no need to provide a connection between electrodes 14 and 15 through glass enclosure 18.

In accordance with an aspect of the invention, each of electrodes 14 may include a portion that is perforated for enabling electron beam 30 to pass therethrough on its way to coat 20. Consequently, a signal dip will occur in the top or peak portion of the waveform of index signal 15a that is generated at electrode 15 when electron beam 30 goes through a corresponding perforation in electrode 14.

Corresponding index signal 15a may be generated for each of the three electron beams 30 in CRT 110. Thus, a given signal 15a varies when the corresponding electron beam 30 passes through the perforations in electrode 14. The aforementioned signal dip at the top portion of each of signals 15a is used for evaluating the position of the electron beam and for determining and correcting the state of convergence of the three electron beams.

Figure 2:
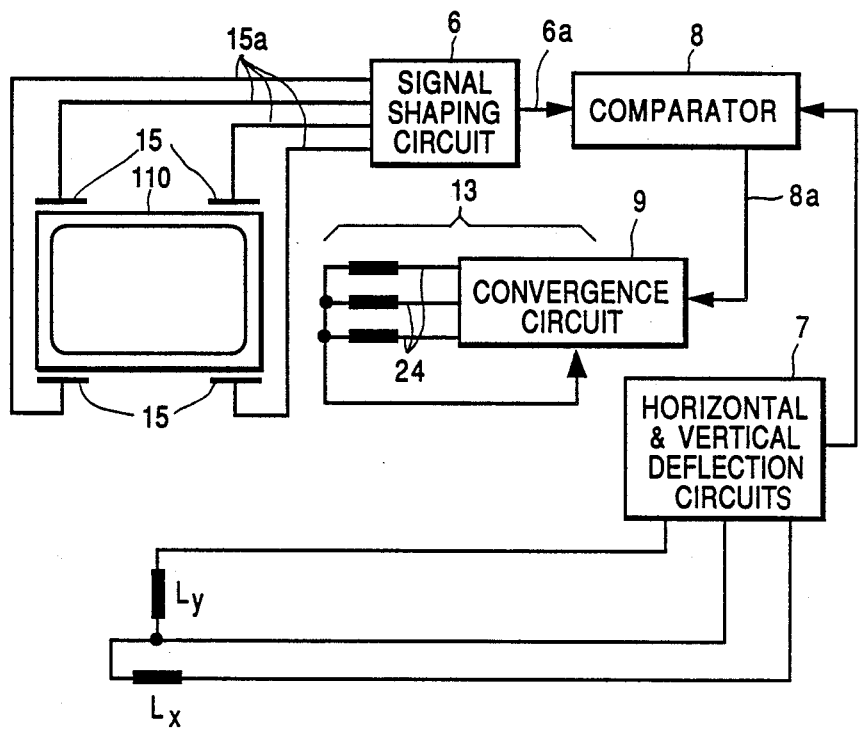
FIG. 2 illustrates a block diagram of a circuit for providing convergence correction for the cathode ray tube of FIG. 1.

FIG. 2 illustrates a block diagram of a circuit for correcting convergence errors, embodying an aspect of the invention. Similar numerals and symbols in FIGS. 1 and 2 indicate similar items or functions. Electrodes 14 of FIG. 1 define an index device 11. Index signals 15a tapped from electrodes 15 are coupled to a signal waveform shaping circuit 6 of FIG. 2 that may include a Schmitt trigger and, if necessary, a preamplifier. Output signals 6a of circuit 6 and timing signals at the horizontal rate produced in a deflection circuit 7 are coupled to corresponding input terminals of a comparator 8. A convergence circuit 9 varies magnitude of currents in convergence windings 24 for providing dynamic convergence correction, in accordance with an output signal 8a of comparator 8.

By means of index device 11, the times at which each of the three electron beams 30 strikes the corresponding electrodes 14 are determined. Such times are controlled by deflection circuit 7 and by convergence circuit 9. The times in which each of the three electron beams 30 strike a given electrode 14 are thus controlled by varying the currents in convergence windings 24 in a manner that causes the three electron beams 30 to converge on coat 20.

FIG. 3 illustrates a block diagram of a circuit for the correction of line displacements embodying a further aspect of the invention. Similar symbols and numerals in FIGS. 2 and 3 indicate similar items or functions.

An index strip 22 and an index strip 32 of FIG. 3 are arranged at the left and right margins, respectively, of a picture producing luminous coat 20' or screen of a CRT 110'. Index strips 22 and 32 extend vertically and are preferably, arranged at the outermost margins of or outside the visible portion of luminous coat 20'. Index strips 22 and 32 may be formed by corresponding pair of light emitting layers in the corresponding margins of coat 20. When either layer 22 or 32 is hit by the electron beam, it emits light. The emitted light may be, preferably, in a non-visible spectrum such as, for example, at the ultraviolet range.

Photosensitive elements 4 and 5 that are placed outside CRT 110' are photocoupled to index strips 22 and 32. Elements 4 and 5 generate signals 4a and 5a, respectively, when strips 4 and 5 light up as a result of the electron beam impact. Signals 4a and 5a are processed in signal shaping circuit 6'. A signal 6'a, which is an impulse sequence at the horizontal line frequency, is tapped at an output terminal of circuit 6'. The impulses of signal 6'a indicate the times at which a given electron beam passes index strip 22 or and 32.

A horizontal deflection circuit 7' includes circuitry for providing sinusoidal deflection current, a comparator and a one-shot multivibrator, not shown. The comparator is responsive to a reference level and to a deflection current representative signal. An output of the comparator is used for triggering the one-shot multivibrator. The output of the multivibrator generates corresponding impulses 7'a, whose time of occurrence is, preferably, chosen to coincide with the time at which the electron beam is expected to pass index strip 22 or 32 when no distortion occurs. Accordingly, in the case of nonlinearity resulting from, for example, a scanning hysteresis, impulses 7'a are displaced in time.

In accordance with a feature of the invention, comparator 8 generates, in accordance with a time difference between the timings of impulses 6'a of circuit 6' and the timings, of impulses 7'a of deflection circuit 7'a control signal 8a that is coupled to a regulating control unit 9'. Regulating unit 9' may be a conventional convergence circuit. For example, unit 9' might either have a regulating effect on deflection circuit 7' to compensate for the hysteresis. Alternatively, unit 9' might include an analog-to-digital converter having an output, digital word that is coupled to a counter, not shown, for providing memory addressing to a line storage shown as unit 10 to provide such compensation. In the latter case, the pixel signals of picture content carrying video signals 10a generated by the line storage of unit 10 are displaced in time to a degree necessary for providing vertical alignment of pixels displayed in successive horizontal lines. A video-amplifier 11 is coupled to line storage 10 for modulating the intensity of the corresponding electron beams.

Advantageously, the circuits of FIGS. 1–3 provide a fast response time and accurate compensation to beam current displacement. In addition to compensating for the nonlinearity that is caused by hysteresis, it is also possible to compensate for any irregular nonlinear behavior of the corresponding deflection circuit.

What is claimed is:

1. A cathode ray tube for displaying an image therein, comprising:
   an evacuated enclosure containing therein an electron beam gun;
   a perforated, first electrode disposed inside said enclosure and responsive to said electron beam for generating a first index signal that varies when said electron beam passes through the perforations in said first electrode such that said index signal is indicative of a position of said electron beam; and
   a second electrode disposed outside said enclosure and capacitively coupled through said enclosure to said first electrode for developing in said second electrode a second index signal that varies in accordance with said first index signal and that is indicative of said position of said electron beam.

2. An apparatus according to claim 1 further comprising, means responsive to said second index signal and coupled to a deflection circuit for varying a deflection of said beam in a manner that corrects a raster distortion.

3. An apparatus according to claim 1 further comprising, a bleeder resistor disposed inside said enclosure and having a first terminal that is coupled to a shadow mask of said cathode ray tube and a second terminal that is coupled to said first electrode.

4. An apparatus according to claim 1 wherein said second electrode is disposed adjacent an outer surface of said enclosure.

5. An apparatus according to claim 1 wherein said first electrode is disposed at least at a side, top or bottom margin of a picture producing screen of said cathode ray tube.

6. An apparatus according to claim 1 further comprising, means responsive to said second index signal and coupled to a video line storage circuit that provides a video signal to a given gun of said cathode ray tube for varying timing of said video signal in accordance with said second index signal in a manner that corrects a raster distortion.

7. An apparatus according to claim 6 wherein said video signal timing varying means comprises a location counter that provides addressing of a line storage element for varying the value of the address of said storage element that contains said video signal in accordance with said second index signal.

8. A television apparatus for correcting a raster distortion in a cathode ray tube, comprising:
   a light emitting coat forming an index device disposed in a path of an electron beam of said cathode ray tube for emitting light that is substantially outside the visible range and that is indicative of a position of said electron beam;
   a photosensitive sensor optically coupled to said light emitting coat for generating an index signal;
   a source of an input signal at a frequency that is related to a deflection frequency;
   means responsive to said input signal and to said index signal for generating a control signal that is indicative of a time difference therebetween; and
   a storage circuit responsive to said control signal for generating a video signal that varies in accordance with said control signal in a manner that corrects said raster distortion.

9. An apparatus according to claim 8 wherein said light emitting coat is arranged at both sides of a picture producing of said cathode ray tube.

10. An apparatus according to claim 9 wherein said light emitting coat is arranged outside a picture producing screen area of said cathode ray tube.

11. An apparatus according to claim 10 wherein the light that is emitted by said light emitting coat of said index device is within an ultraviolet spectrum.

12. An apparatus according to claim 8 wherein said controlling means is coupled to a convergence circuit for correcting convergence distortion.

13. An apparatus according to claim 8 wherein said control signal generating means comprises a location counter of a line storage, which varies an output signal of said location counter upwards or downwards by a predefined value in accordance with said index signal.

14. A cathode ray tube for displaying an image therein, comprising:
   an evacuated enclosure containing therein an electron beam gun;
   a first electrode disposed inside said enclosure and responsive to said electron beam for generating a first index signal that is indicative of a position of said electron beam, said first electrode having an L-shape form with a first surface for providing a target to said electron beam and with a second surface that is angularly disposed relative to said first surface and that is disposed against said enclosure for forming a first electrode of a capacitive coupling arrangement; and a second electrode disposed outside said enclosure and capacitively coupled through said enclosure to said second surface of said first electrode for developing in said second electrode a second index signal that varies in accordance with said first index signal and that is indicative of said position of said electron beam.

* * * * *